(12) United States Patent
Lutnick et al.

(10) Patent No.: US 12,346,967 B2
(45) Date of Patent: *Jul. 1, 2025

(54) SYSTEMS AND METHODS FOR MAINTAINING THE VIABILITY OF A GOOD-UNTIL-BETTERED ORDER TYPE IN ELECTRONIC TRADING SYSTEMS

(71) Applicant: BGC PARTNERS, INC., New York, NY (US)

(72) Inventors: Howard W. Lutnick, New York, NY (US); Kevin M. Foley, New York, NY (US); Joseph Noviello, Summit, NJ (US); Michael Sweeting, Aldershot (GB)

(73) Assignee: BGC PARTNERS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,348

(22) Filed: Nov. 7, 2023

(65) Prior Publication Data

US 2024/0070785 A1  Feb. 29, 2024

Related U.S. Application Data

(60) Continuation of application No. 17/876,704, filed on Jul. 29, 2022, now Pat. No. 11,847,701, which is a continuation of application No. 16/702,072, filed on Dec. 3, 2019, now Pat. No. 11,403,704, which is a division of application No. 13/887,486, filed on May 6, 2013, now abandoned, which is a continuation of application No. 11/407,509, filed on Apr. 20, 2006, now Pat. No. 8,438,097.

(60) Provisional application No. 60/673,614, filed on Apr. 20, 2005.

(51) Int. Cl.
  *G06Q 30/00* (2023.01)
  *G06Q 40/04* (2012.01)

(52) U.S. Cl.
  CPC ................................ *G06Q 40/04* (2013.01)

(58) Field of Classification Search
  CPC ...................................................... G06Q 40/04
  USPC .............. 705/37, 1.1, 27.1, 26.1, 44, 35, 28; 395/201, 226, 237, 792; 379/88, 92
  See application file for complete search history.

(56) References Cited

U.S. PATENT DOCUMENTS 5,689,652 A * 11/1997 Lupien .................. G06Q 40/04
                                                        705/37
5,835,896 A * 11/1998 Fisher ................... G06Q 30/08
                                                        705/37

OTHER PUBLICATIONS

ProQuestDialogNPL Search History.*

* cited by examiner

*Primary Examiner* — John H. Holly

(57) ABSTRACT

Systems and methods of trading items on an electronic trading system according to the invention are provided. The embodiments of the invention are based at least in part on a new order type. The new order type is a modification of a conventional good-until-bettered order type. A good-until-bettered bid/offer is received along with instructions that specify a good-until-bettered increment value and/or duration. The good-until-bettered order is maintained in the electronic trading system until a bid/offer that is better by the specified plurality of standard trading increments is received by the electronic trading system and/or remains in the system for the good-until-bettered duration.

14 Claims, 2 Drawing Sheets

SYSTEMS AND METHODS FOR MAINTAINING THE VIABILITY OF A GOOD-UNTIL-BETTERED ORDER TYPE IN ELECTRONIC TRADING SYSTEMS

CROSS-REFERENCE TO RELATED APPLICATIONS

This application is a continuation of U.S. patent application Ser. No. 17/876,704 filed Jul. 29, 2022, which is a continuation of U.S. patent application Ser. No. 16/702,072 filed Dec. 3, 2019 (now U.S. Pat. No. 11,403,704 issued Aug. 2, 2022), which is a divisional of U.S. patent application Ser. No. 13/887,486 filed May 6, 2013, which is a continuation of U.S. patent application Ser. No. 11/407,509 filed Apr. 20, 2006 (now U.S. Pat. No. 8,438,097 issued May 7, 2013), which claims the benefit of U.S. Provisional Application No. 60/673,614 filed Apr. 20, 2005, each of which is incorporated by reference herein in its entirety.

BACKGROUND OF THE INVENTION

This invention relates to electronic trading systems. More specifically, this invention relates to order types for use in electronic trading systems.

Electronic trading systems typically provide participants with the ability to enter orders into the system. More particularly, many electronic trading systems provide the ability for participants to enter resting (alternatively referred to herein as "passive") bids and offers. Such trading systems may preferably hold the most attractive bids and offers for browsing by other participants. These most attractive bids or offers may be used to provide views of the "depth" of the prices available on an instrument at price levels other than the best bid and offer price levels.

In the same or other systems, a best bid—i.e., the bid having the best price such as the highest dollar or nominal price or the lowest yield—or a best offer—i.e., the offer having the best price such as the lowest dollar or nominal price or the highest yield—may be removed when a respective better bid or offer enters the market. This allows participants to concentrate on their bids and offers when they are at the best market price. Bids that are bettered are commonly referred to as "topped" and offers that are bettered are commonly referred to as "cut". A bid that tops another is one that has a better price—e.g., a higher dollar or nominal price or a lower yield. Similarly, an offer that cuts another is one that has a better price—e.g., a lower dollar or nominal price or a higher yield. Such a bid or offer that is removed from the trading system on occurrence of it being topped or cut may be referred to as a "good-until-bettered" order. This is in contrast to a "limit" order that remains listed and available for trading in a trading system until traded or cancelled. In the latter situation, participants placing such orders are forced to remain constantly aware of their existence. A limit order may be set to remain good until traded or cancelled for a trading session, multiple trading sessions or any other suitable period.

One of the advantages of a good-until-bettered order type is that in some situations a participant may only want to bid or offer for a short time span. Alternatively, a participant may only want to bid or offer while her attention is focused on a particular instrument. In such situations a good-until-bettered order reduces the duration of the order in the system.

For example, if the market price of that instrument moves away from the participant's desired bid or offer level without her bid or offer order being fully executed, the participant may select to trade in another similar marketplace, or on another instrument. In these situations, the participant may not desire to cancel her existing good-until-bettered order. In the interests of speed and efficiency a good-until-bettered order type may become preferable to a limit or other order type, especially in fast moving markets where a participant's thought processes, or a computer's processing speed, are at a premium.

An occasional disadvantage of a good-until-bettered order type occurs when there is a gap in the inside market—e.g., when there may be a relatively large price differential between the best bid and the best offer or even just a price differential of one price increment or more. In such a situation, a participant working a good-until-bettered bid—e.g., showing a desire to transact without wishing to leave the bid if the market moves away from the desired price—could be taken advantage of by another participant topping him, canceling the original participant's topping bid, and subsequently bidding at the original bid price ahead of the original participant. If a first participant is working a "good-until-bettered" bid order in such a situation, a subsequent "topping participant" taking advantage of a gap in the market may knock the first participant's order out of the trading system either unnecessarily, or for the topping participant's trading advantage. This may be contrary to what the first participant intended, and often serves to unnecessarily remove liquidity from the trading system by knocking out good-until-bettered orders, even when the market price of the instrument is not moving away from them.

Another disadvantage of certain types of orders relates to locked markets. Locked markets are markets where a bid and offer exist at the same price but do not trade. Some trading systems allow a bid and offer to co-exist at the same price without matching them. Reasons that some trading systems may allow this may include (but are not limited to) the sizes of the bid and offer being incompatible; the customers who entered the bid and offer being unable to trade with each other for credit or other reasons; neither participant being willing to pay brokerage that the trading system may need as a precursor to matching a trade; or the trading system awaiting another priority participant to be timed out in a trading auction situation such as in the trading system described in U.S. Pat. No. 6,560,580. Participants may also top and cut in such trading systems by locking a contra offer or bid—i.e., placing a bid with a price that matches a current offer price, or an offer with a price that matches a current bid price but either not allow the just entered bid and just entered offer to trade, or by taking advantage of the trading system rules such that the locking bid or offer will not trade. In such circumstances, the previous market bids or offers that are good-until-bettered may be canceled but no trade may occur.

It is therefore an object of the present invention to provide systems and methods for maintaining the viability of a good-until-bettered order in electronic trading systems.

SUMMARY OF THE INVENTION

This and other objects are accomplished in accordance with the principles of the invention by providing systems and methods of trading items on an electronic trading system. The embodiments of the invention are based at least in part on a new order type. The new order type is a modification of a conventional good-until-bettered order type. A method according to the invention includes receiving a good-until-bettered bid/offer or other suitable order or trading command in a particular market; receiving instructions that specify a good-until-bettered increment value, the good-until-bettered increment value being one that further specifies a standard trading increment amount for the bid/offer and maintains the good-until-bettered bid/offer in the electronic trading system until a bid/offer that is better—i.e., a bid/offer having a better price by the specified amount of—i.e. at least one—standard trading increments is received by the electronic trading system. In other words, the good-until-bettered bid is maintained until it is topped by another bid having a better price—e.g., a higher dollar or nominal price or a lower yield—by the specified amount of standard trading increments. Similarly, the good-until-bettered offer is maintained until it is cut by another offer having a better price—e.g., a lower dollar or nominal price or a higher yield—by the specified amount of standard trading increments. Finally, when the bid/offer that is better by the specified amount of standard trading increments is received by the electronic trading system, the good-until-bettered bid/offer is canceled.

Another method according to the invention includes receiving a good-until-bettered bid/offer or other suitable order or trading command; receiving instructions that specify a good-until-bettered duration setting, the good-until-bettered duration setting being on that further specifies a good-until-bettered duration for the bid/offer and maintains the good-until-bettered bid/offer in the electronic trading system until a bid/offer that is better than the good-until-bettered bid/offer is received by the electronic trading system and remains in the system for the specified good-until-bettered duration. Finally, when the bid/offer that is better than the good-until-bettered bid/offer remains in the system for the good-until-bettered duration, the good-until-bettered bid/offer is canceled.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
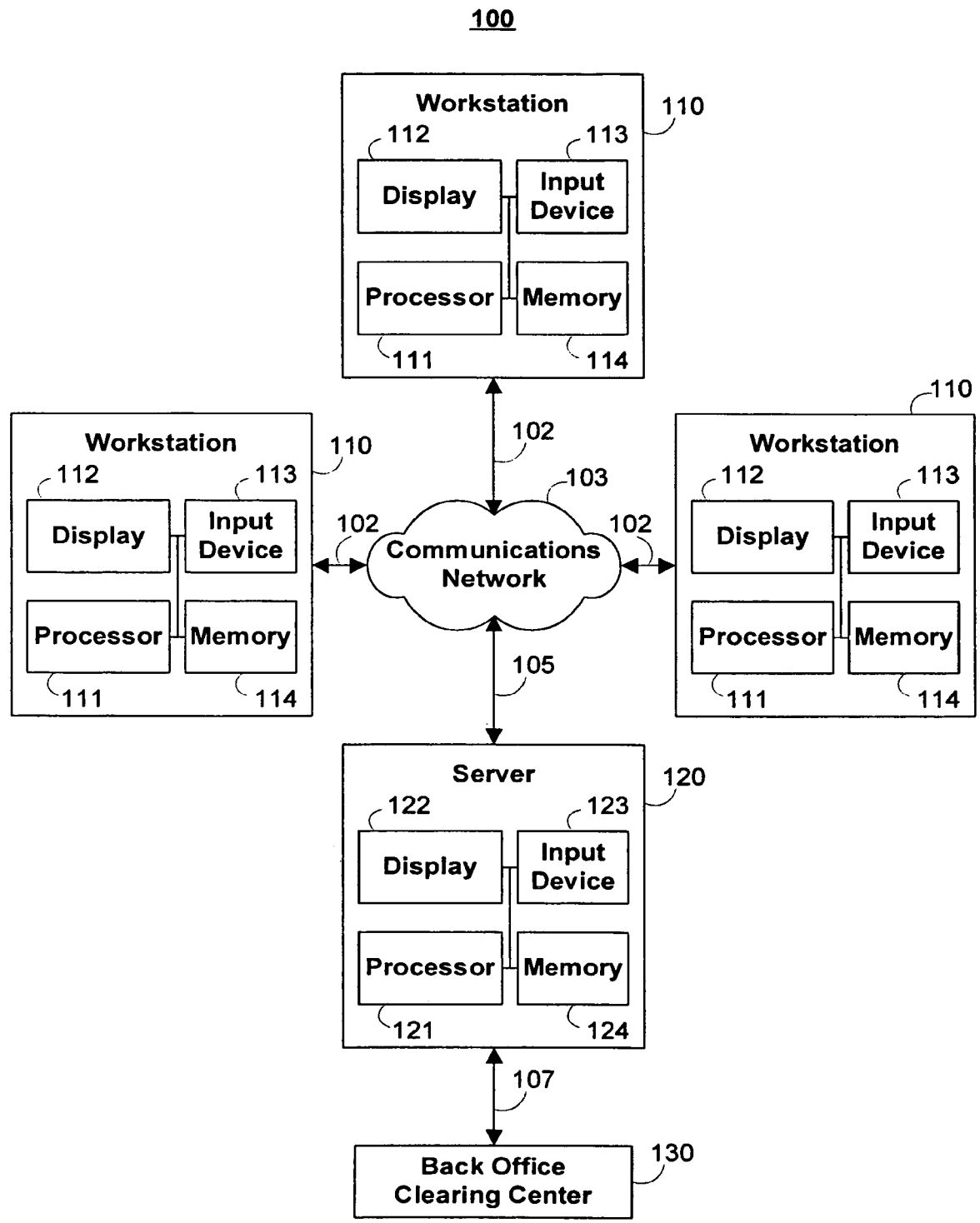
FIG. 1 is a block diagram of an exemplary system that may be used to implement the processes and functions of certain embodiments of the present invention.

Electronic trading systems that use a conventional good-until-bettered order type afford participants the advantage of being able to bid or offer at current markets without concerning themselves with canceling or otherwise removing these bids and offers if the market price moves away from their order. In accordance with the invention, a trading system may be given a system setting to only cancel good-until-bettered orders if they are topped or cut by more than a certain amount X of minimum price increments. The initial system setting of X may be two minimum price increments for US Treasuries. An exemplary increment in US Treasuries is that two-year Treasury Notes trade at a market participant standard minimum price increment of ⅛ of 1/32 of one percent of the nominal value of the Treasury Note. This value of X may be set either by the trading system for a particular participant, or by the particular participant, and the trading system may be configured for either value to prevail.

With such a novel order type, participants have the ability to preferably prevent such topping and cutting for trading advantage. The existence of such an order type may in itself dissuade such activity on the trading system, as protagonists of topping and cutting for trading advantage may not know which orders would be knocked out by the practice.

In some trading systems the existence of a limit order is displayed by an attribute, which may be an A, a*, or some other suitable character, or even an electronic attribute available for electronic interpretation. In these trading systems the existence of good-until-bettered orders may thus be uncovered and become a target for the practice of topping or cutting for trading advantage. The importance of the invention on such trading systems may become particularly apparent to participants, in that it makes such a practice less likely to succeed because many good-until-bettered orders would not be knocked out by such a practice of closely tailored topping or cutting.

Additional Solutions

With respect to a bid that topped an existing bid or an offer that cut an existing offer, the previously entered market bid or the previously entered market offer may, in some embodiments of the invention, still be topped or cut, and consequently knocked out of the trading system by a new order which may improve the market price by even less than the preferably pre-determined price increment or number of price increments, when a timer indicates that the subsequent bid that topped, or offer that cut, has been in the system for a specified, preferably pre-determined, amount of time. The amount of time may preferably be adjustable depending on the volatility of trading; the time of day; the proximity of economic figures being released; the market price or a moving average of such being outside certain boundaries; or some other suitable factor.

This embodiment of the invention preferably alleviates the problem of participants who had previously entered market bids and offers from having those market bids and offers topped or cut by another order that does not then exist in the system for a relatively long time. Such a time threshold would continue to permit more serious subsequent bids and offers, as evidenced by the amount of time these subsequent bids, and offers remain in the system, to cut or top the previously entered bids and offers, respectively. The amount of time that such a subsequent order may be listed on the trading system in the "order book" before it can cut or top another order may act to stop participants abusing the trading system for their advantage, but still enable the advantages of the good-until-bettered order type to persist.

The confluence of the above-described innovations for a good-until-bettered order type further refines and enhances the protection of a good-until-bettered order from being unnecessarily topped or cut. Good-until-bettered orders may be firstly protected from being prematurely knocked out of the trading system order book via the requirement that new orders be of more than one pre-determined price increment better than the good-until-bettered order; and may then be additionally, or alternatively, protected in that the topping or cutting order is required to be maintained in an available state in the trading system for a certain period of time before the good-until-bettered order may be knocked out.

In the case of a topping or cutting order improving upon the good-until-bettered order by more than the pre-determined increment, the time restriction as explained above stops topping or cutting from immediately taking place. In the case of a topping or cutting order that is less than the pre-determined increment, the time threshold (or, alternatively, duration requirement) allows a genuine topping or cutting order to appropriately top or cut, albeit after a preferably predetermined amount of time. Thus, according to the invention, the good-until-bettered order type retains its advantage of excusing a participant from maintaining, or being required to cancel or remove, active orders or positions in a market for which they no longer have a continuing bona fide interest, but is preferably protected from being knocked out of the trading system prematurely where the market price has not moved substantially enough to warrant cancellation. Participants who want bids or offers to linger in the market for a longer period than the order type above allows (irrespective of whether they are topped, cut, or no longer at the best price level) may use a limit order preference as known in the art.

Aggressive Orders as New Markets

In many trading systems, there is a differentiation between a "passive" bid or offer, and an "aggressive" take or hit (otherwise referred to as buy or sell). Passive orders may exist in the trading system and provide lists of bids and offers on a particular instrument, whereas aggressive sells or buys (hits or takes) may execute upon those passive bids or offers. Preferably, in such trading systems, an order type may be employed that turns such an aggressive buy or sell order into a passive bid or offer where no contra offer or bid. is available to trade with. This functionality is related to an order type referred to herein as "Order as New Market". Order as New Market preferably allows the participant to enter a Buy or Sell order that may not be at the best price and still have it subsequently accepted as a new bid or offer and be permitted to persist in the order book.

These orders may be accepted as executable orders and stay in the trading system order lists or order book. For instance, if the participant enters an aggressive good-until-bettered buy order and fails to match against any offers—i.e., does not get executed—if the market price of the instrument moves up as the participant enters the order, any good-until-bettered order that may be retained by the trading system may be knocked out by a better bid entered at that time or afterwards. The Order as New Market functionality preferably turns this aggressive trade attempt order into a good-until-bettered order, and the new settings according to the invention, as described in more detail above for such orders, may allow the exemplary order to be accepted as a new order for the trading system order book. The new order may be entered by the same participant that entered the good-until-bettered order or by another participant. The new good-until-bettered order type as disclosed above may protect such an order from being knocked out of the trading system by (1) either better orders corning in just before or almost at the same time as the participant's aggressive order, or (2) subsequent topping and cutting orders.

In such a fashion, the participant can be afforded the convenience of having his aggressive order retained by the trading system, which aggressive order may otherwise have been discarded due to no execution, and also enjoying the added benefit of the trading system keeping said order in the order book. The order may be maintained in the order book up to a configurable amount of price increments away from the best bid, and such that the participant's new order is not knocked out by other orders received at or about the same time. Preferably, the participant may also determine a finite period of time that his new order then remains in the trading system.

Referring to FIG. 1, exemplary system 100 for implementing the invention is shown. As. illustrated, system 100 may include one or more workstations 110. Workstations 110 may be local or remote and are connected by one or more communications links 102 to communications network 103 that is linked via communications link 105 to server 120. Server 120 may be linked to back office clearing center 130 via communications link 107.

Server 120 may be any suitable server, processor, computer, data processing device, or combination of the same. Server 120 may be used to implement the governing logic that processes and executes orders and trades, and distributes trade and market information, including price and size information, to workstations 110. Communications network 103 preferably includes the Internet but may consist of any suitable computer network such as an intranet, a wide-area network (WAN), a local-area network (LAN), a wireless network, a digital subscriber line (DSL) network, a frame relay network, an asynchronous transfer mode (ATM) network, a virtual private network (VPN), or any combination of the same. Communications links 102 and 105 may be any communications links suitable for communicating data between workstations 110 and server 120, such as network links, dial-up links, wireless links, hard-wired links, etc.

Workstations 110 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 110 may be used by participants to enter bid, offer, buy and sell orders for the items being traded and view market activity corresponding to these items.

A typical workstation 110 may include processor 111, display 112, input device 113, and memory 114, which may be interconnected. In a preferred embodiment, memory 114 includes a storage device for storing a workstation program for controlling processor 111. Memory 114 may also store user configuration files, as described below, and other data on the storage device. The workstation program may include a trading application for running a trading interface that may be displayed on display 112. Input device 113 may be used in conjunction with display 112 by users to enter good-until bettered bids/offers and to execute and monitor trades. Processor 111 may use the workstation program to receive trade information relating to the items being traded by multiple users of system 100, or other users, and display such information on display 112 or communicate such information to display 112. For example, workstation 110 may receive a good-until-bettered order as well as instructions that specify: a good-until-bettered increment value specifying an amount of standard trading increments for the order, and/or a good-until-bettered duration setting specifying a good-until-bettered duration for the order.

Server 120 may include processor 121, display 122, input device 123, and memory 124, which may be interconnected. In a preferred embodiment, memory 124 includes a storage device for storing a server program that provides the governing logic for controlling processor 121. Processor 121 may use the server program to process orders and execute trades communicated from various workstations that are operated by multiple users of system 100, or other users, and communicate trade information, as well as bid and offer information, to workstations 110 and back office clearing center 130. More specifically, processor 121 may use the server program to process orders placed by users in response to users entering commands using input device(s) 113, and execute trades based on such orders, whenever applicable.

For example, server 120 may maintain the good-until-bettered order in the electronic trading system until a bid or offer that is better than the good-until-bettered order by the specified amount of standard trading increments is received by the electronic trading system and/or until a bid or offer that is better than the good-until-bettered order is received by the electronic trading system and remains in the system for the good-until-bettered duration. Thereafter, the server 120 may cancel the good-until-bettered order.

Back office clearing center 130 may be any suitable equipment, such as a computer, a laptop computer, a mainframe computer, etc., or any combination of the same, for causing trades to be settled and/or verifying that trades are settled. Communications link 107 may be any communications links suitable for communicating data between server 120 and back office clearing center 130, such as network links, dial-up links, wireless links, hard-wired links, etc.

Figure 2:
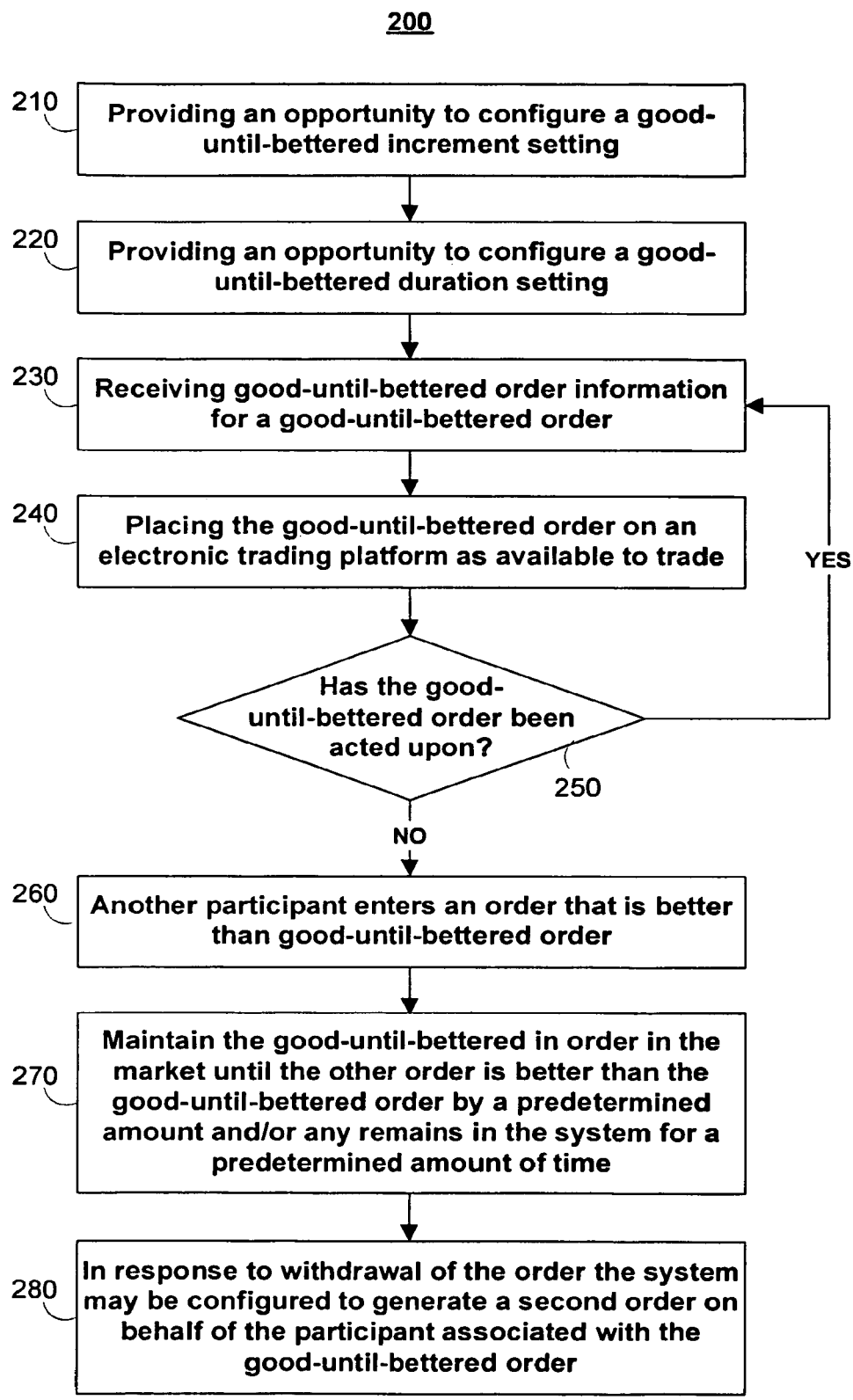
FIG. 2 is a flow diagram that shows one method according to the invention.

FIG. 2 is a flow chart 200 that describes one embodiment of a method according to the invention. Step 210 shows providing a user with an opportunity to configure a good-until-bettered increment setting. Step 220 shows providing a user with an opportunity to configure a good-until-bettered duration setting. Step 230 shows receiving good-until-bettered order information for a good-until-bettered order. Step 240 shows placing the good-until-bettered order on an electronic trading platform available to trade. Preferably the good-until-bettered order incorporates the increment setting and/or the duration setting. Alternatively, the system monitors the good-until-bettered order and maintains it within the system until the appropriate conditions have occurred.

If the good-until-bettered order is not immediately acted upon, as queried in step 250, another trading participant, or the same participant that entered the good-until-bettered order, may enter a second order on the same side of the market as the good-until-bettered order, as shown in step 260.

In such a circumstance, the good-until-bettered order may remain in the system even though trading priority has passed to the second order, as shown in step 260.

Step 270 shows that the good-until-bettered order is preferably not withdrawn (alternatively referred to herein as "cancelled") from the market until the pre-determined time period passes and/or the second order is a sufficient number of increments better than the good-until-bettered order.

Step 280 shows that in response to the withdrawal of an order, the system may be configured, either by a user or by a system configuration, to preferably immediately generate a second order on behalf of the participant that entered the good-until-bettered order. The second order is preferably on the same side of the market as the good-until-bettered order. The second order is preferably entered and maintained at a system-set or user configured number of increments away from the best order on the same side of the market. Such a generated order allows the participant associated with the good-until-bettered order to maintain participation in a market that has moved away from his original good-until-bettered order, while limiting his exposure to difficult-to-predict market changes.

For example, a good-until-bettered bid may be maintained until it is topped by a better bid by the specified amount of standard trading increments and/or may remain in the system for the specified good-until-bettered duration. A better bid may be a bid with a higher price, such as a bid higher in dollar or nominal price, or a bid with a lower price, such as a bid lower in yield. Similarly, a good-until-bettered offer may be maintained until it is cut by a better offer by the specified amount of standard trading increments and/or may remain in the system for the specified good-until-bettered duration. A better offer may be an offer with a lower price, such as a bid lower in dollar or nominal price, or an offer with a higher price, such as an offer higher in yield.

It has been shown that systems and methods for providing a good-until-bettered order type according to the invention are provided.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

The invention claimed is:

1. A method of trading items on an electronic trading system, the method comprising:
    controlling, by at least one processor:
        receiving, over a communication network, from a first computing device, a good-until-bettered bid;
        specifying a good-until-bettered duration for the good-until-bettered bid, from a good-until-bettered duration setting which is based on real time market information received over the communication network;
        automatically responsive to receiving the good-until-bettered bid, activating an electronic timer to time the good-until-bettered duration;
        determining whether a bid that tops the good-until-bettered bid by at least a predetermined amount is received, over the communication network from a second computing device, by the electronic trading system;
        determining, based on a timing being timed by the electronic timer, whether the good-until-bettered bid remains in the electronic trading system for the good-until-bettered duration; and
        automatically responsive to determining that the bid that tops the good-until-bettered bid remains in the electronic trading system for the good-until-bettered duration, canceling the good-until-bettered bid and immediately generating a second order on behalf of a user of the first computing device with which the good-until-bettered bid is associated.

2. The method of claim 1, further comprising controlling, by the at least one processor, receiving, over the communication network from another computing device, user instructions that specify the good-until-bettered duration setting.

3. The method of claim 1, further comprising controlling, by the at least one processor, receiving, over the communication network, instructions from the electronic trading system that specify the good-until-bettered duration setting.

4. A method of trading items on an electronic trading system, the method comprising:
    controlling, by at least one processor:
        receiving, over a communication network, from a first computing device, a good-until-bettered offer;
        specifying a good-until-bettered duration for the good-until-bettered offer, from a good-until-bettered duration setting which is based on real time market information received over the communication network;

automatically responsive to receiving the good-until-bettered offer, activating an electronic timer to time the good-until-bettered duration;

determining whether an offer that cuts the good-until-bettered offer by at least a predetermined amount is received, over the communication network from a second computing device, by the electronic trading system;

determining, based on a timing being timed by the electronic timer, whether the good-until-bettered offer remains in the electronic trading system for the good-until-bettered duration; and automatically responsive to determining that the offer that cuts the good-until-bettered offer remains in the electronic trading system for the good-until-bettered duration, canceling the good-until-bettered offer and immediately generating a second order on behalf of a user of the first computing device with which the good-until-bettered offer is associated.

5. The method of claim 4, further comprising controlling, by the at least one processor, receiving, over the communication network from another computing device, user instructions that specify the good-until-bettered duration setting.

6. The method of claim 4, further comprising controlling, by the at least one processor, receiving, over the communication network, instructions from the electronic trading system that specify the good-until-bettered duration setting.

7. An electronic trading system comprising:
a server including at least one processor configured to control:
receiving, over a communication network, a good-until-bettered order;

specifying a good-until-bettered duration for the good-until-bettered order, from a good-until-bettered duration setting which is based on real time market information received over the communication network;

automatically responsive to receiving the good-until-bettered order, activating an electronic timer to time the good-until-bettered duration;

determining whether a bid or offer that is better than the good-until-bettered order by at least a predetermined amount is received, over the communication network from a first computing device, by the electronic trading system;

determining, based on a timing being timed by the electronic timer, whether the good-until-bettered order remains in the electronic trading system for the good-until-bettered duration; and automatically responsive to determining that the bid or offer that is better than the good-until-bettered order remains in the electronic trading system for the good-until-bettered duration, canceling the good-until-bettered order and immediately generating a second order on behalf of a user of the first computing device with which the good-until-bettered order is associated.

8. The system of claim 7, wherein the second order differs from a current best order by a predetermined plurality of increments.

9. The system of claim 7, wherein the at least the predetermined amount is a specified amount of standard trading price increments.

10. The system of claim 7, wherein another order that cuts the good-until-bettered order is received, over the communication network at the at least one processor, from a given computing device of trading participant associated with the good-until-bettered order.

11. The system of claim 7, wherein:
the good-until-bettered order is a good-until-bettered bid; and
the at least one processor is configured to control deactivating the good-until-bettered bid when a bid is entered into the electronic trading system, over the communication network, from the first computing device, at a predetermined number of trading increments higher than the good-until-bettered bid, and in which the trading increments comprise price increments.

12. The system of claim 7, wherein:
the good-until-bettered order is a good-until-bettered bid; and
the at least one processor is configured to control deactivating the good-until-bettered bid when a bid is entered into the electronic trading system, over the communication network, from the first computing device, at a predetermined number of trading increments lower than the good-until-bettered bid.

13. The system of claim 7, wherein the second order is a predetermined number of increments away from the good-until-bettered order.

14. The system of claim 7, wherein the second order is on a same side as the good-until-bettered order.

* * * * *